United States Patent [19]

Ookubo

[11] Patent Number: 4,697,943
[45] Date of Patent: Oct. 6, 1987

[54] ELECTRIC PLATEN DRIVING DEVICE WITH MANUAL OVERRIDE

[75] Inventor: Hiroaki Ookubo, Kurume, Japan

[73] Assignee: Matsushita Electric Industrial Co., Ltd., Osaka, Japan

[21] Appl. No.: 753,566

[22] Filed: Jul. 10, 1985

[30] Foreign Application Priority Data

Jul. 10, 1984 [JP] Japan .................................. 59-142727

[51] Int. Cl.$^4$ ............................................ B41J 19/92
[52] U.S. Cl. .................................. 400/568; 400/569; 400/551; 74/426
[58] Field of Search ............... 400/568, 569, 545, 551, 400/577; 74/426

[56] References Cited

U.S. PATENT DOCUMENTS

| | | | |
|---|---|---|---|
| 1,559,970 | 11/1925 | Meahl | 74/426 |
| 3,403,572 | 10/1968 | Rekewitz | 74/426 |
| 3,828,911 | 8/1974 | Soderstrom | 400/568 |
| 4,090,410 | 5/1978 | Nakamura | 400/569 X |

FOREIGN PATENT DOCUMENTS

| | | | |
|---|---|---|---|
| 3122985 | 12/1982 | Fed. Rep. of Germany | 400/568 |
| 0138675 | 8/1983 | Japan | 400/568 |
| 152881 | 8/1984 | Japan | 400/568 |

Primary Examiner—Edgar S. Burr
Assistant Examiner—David A. Wiecking
Attorney, Agent, or Firm—Wenderoth, Lind & Ponack

[57] ABSTRACT

The present invention relates to a driving device of platen used in printing devices such as typewriters, printers, etc., which is equipped with a motor, a first gear adapted to transmit the output from this motor and provided with notches on part thereof, a second gear which is intermittently driven by continuous rotation of this first gear and a platen driven through this second gear. A pawl holds the platen in place, but allows manual rotation thereof.

2 Claims, 5 Drawing Figures

ELECTRIC PLATEN DRIVING DEVICE WITH MANUAL OVERRIDE

BACKGROUND OF THE INVENTION

1. Field of the Invention

The present invention relates to a driving device of platen used in printing devices, such as typewriters, printers, etc.

2. Description of the Prior Art

Generally, in typical platen driving devices for a printing system having a pulse motor as the driving source, the output from this pulse motor is transmitted through intermediate gears to the platen, thereby turning it.

Such platen driving devices have a problem that pulse motors and the control devices for these motors are costly, giving rise to high cost for the devices as a whole.

SUMMARY OF THE INVENTION

The present invention has been realized with attention focused on the typical above-mentioned problem and its object is to provide a platen driving device which permits providing intermittent drive of platen, using a moderate price motor, without making use of a pulse motor, so that the cost of the device may be reduced.

DESCRIPTION OF PREFERRED EMBODIMENT

Figure 1:
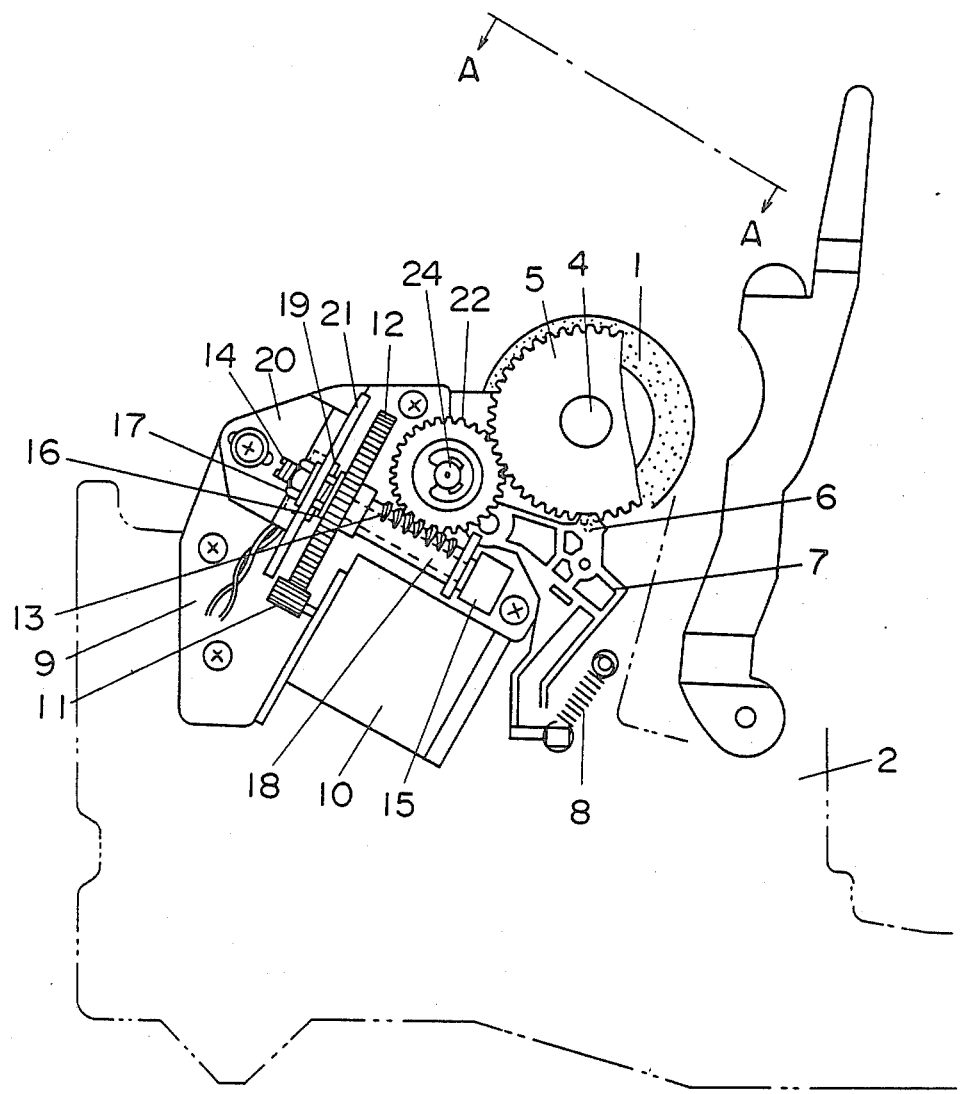
FIG. 1 is a side view of a platen driving device of an embodiment of this invention.
Figure 2:
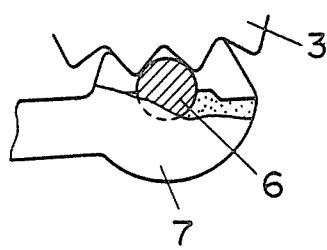
FIG. 2 is an enlarged side view of the essential part of this embodiment.
Figure 3:
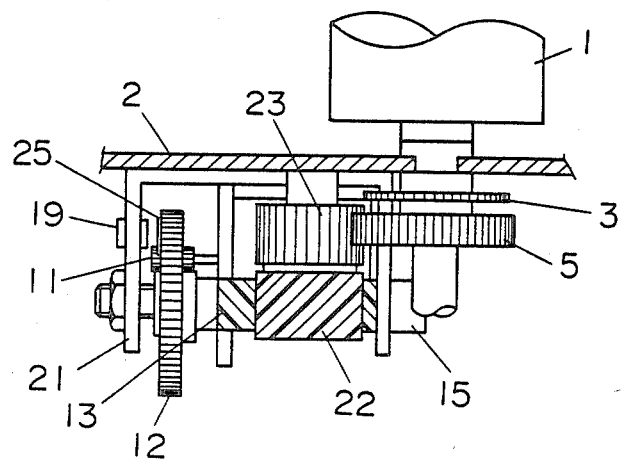
FIG. 3 is a view of the platen driving device shown in FIG. 1 taken from the direction as indicated by arrow marks A.

The present invention will be more fully understood from the following description of a platen driving device embodying this invention taken in conjunction with accompanying drawings:

In these drawings, 1 denotes a platen which is rotatably supported on a side plate 2. Numeral 3 designates ratchet teeth arranged coaxially with a platen 1. A platen gear 5 is also arranged coaxially with the platen 1 and ratchet teeth 3. Numeral 6 represents a detent roller, which is supported by an arm 7 and this arm 7 is biased by a spring 8 in the direction of bringing the aforementioned detent roller into engagement with one of the aforementioned ratchet teeth 3.

Numeral 9 stands for a bracket and on this bracket 9, component parts such as a DC motor 10, etc., are mounted. Numeral 11 represents a driving gear securely held on the output shaft of the aforementioned DC motor 10; this driving gear meshes with a follower spur gear 12, thereby transmitting the turning effort of the DC motor to the follower spur gear 12.

On the aforementioned follower spur gear 12, a worm 18 is formed integrally therewith and this follower spur gear 12 is rotatably supported by a shaft 14, together with the worm 18. The follower spur gear 12 and the worm 18 are detained from axial movement by a shaft boss 15 and a set ring secured on the shaft 14. Numeral 21 designates a bent part of the bracket 9. In this bent part 21, a screw hole is tapped and through this screw hole, the aforementioned shaft 14 is passed. The aforementioned shaft 14 is securely clamped by screwing a nut 17 thereon.

Figure 4:
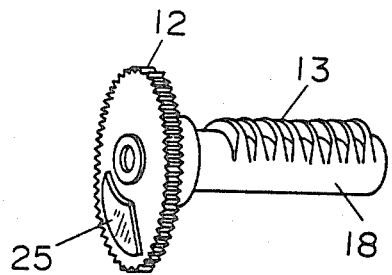
FIG. 4 is a perspective view of the worm used in this embodiment.
Figure 5:
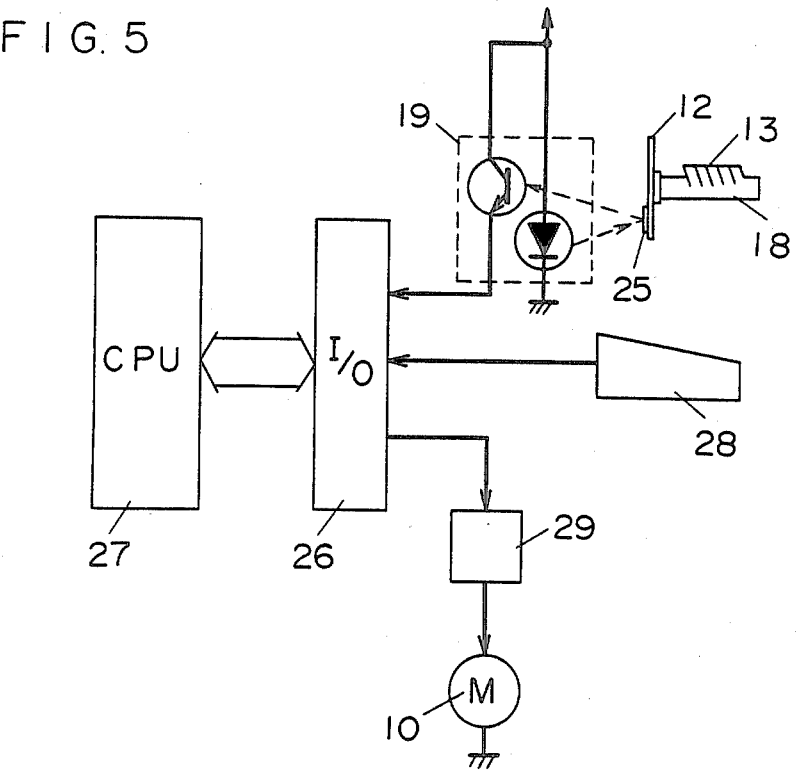
FIG. 5 is a block diagram showing the composition of the platen driving device of this invention.

On part of the aforementioned worm 18, spiral shaped teeth are continuously formed, as shown in FIGS. 1 and 4. On part of one end of the follower spur gear 12, a reflector member 25 is provided.

Numeral 19 denotes a reflection type photodetector securely held on a bracket 20, which not only irradiates a light beam to the reflector means 25 installed on the aforementioned follower gear 12, but detects the reflecting light beam, thereby detecting the rotational position of the follower spur gear 12 and thereby that of the worm 18.

Numeral 22 stands for a worm wheel rotationally driven by teeth 13 formed on part of the outer periphery of the worm 18 in accompaniment with the rotation of the aforementioned worm 18. On the shaft 24 at the center of the rotation of the worm wheel, an intermediate spur gear 23 is coaxially formed. The rotary shaft 24 of this worm wheel 22 and the intermediate spur gear 23 are securely supported in place by the side plate 2 and the bracket 20.

As the worm 18 is continuously turned, the teeth 13 formed on the outer periphery of the worm 18 meshes with the worm wheel 22 once every one turn of the worm 18; accordingly, the worm wheel 22 and the intermediate spur gear 23 will. Accordingly, the plate gear 5 which is meshed with the intermediate spur gear 23 also will make the intermittent rotation in sync therewith. Thus the platen 1 will make an intermittent rotation, thereby conveying the printing paper not shown in the drawings by a specified length at a time. Further, in order to ensure the exact amount of rotation of the platen 1, the roller 6 gets over the detent peak of one of the teeth formed on the outer periphery of the aforementioned ratchet 3 against the biasing force of the spring 8 and, then, fits into its trough. By this engagement of the roller 6 with the ratchet 3, such an outside disturbance as the moment of inertia of the platen 1 which provides an impediment to the rotational positioning may be compensated for.

The detection signal from the reflection type photodetector 19 above-mentioned is entered into a microcomputer 27 (hereinafter abbreviated to cpu) through an in- and out-put device 25 (hereinafter abbreviated to I/O). To the I/O, a keyboard 28 and driver 29 of a DC motor 10 are coupled.

In the following, the operation of this device is described:

At the time when the DC motor begins to run, the teeth 13 formed on the worm 18 and the worm wheel 22 are assumed to be not meshed with each other. After a lapse of time after the DC motor 10 has started running, the teeth 13 of the worm 18 and the worm wheel 22 mesh with each other; then, the worm wheel 22 begins to run, causing the platen to turn through the intermediate gear 23 and the platen gear 5.

Then as the worm 18 further rotates, the meshing between the teeth 13 of the worm 18 and the worm wheel 22 is undone, so that the rotation of the platen 1 is temporarily halted. Thereafter, as the worm 18 makes continuous rotation, again the teeth 13 and the worm wheel 22 mesh with each other. As a result, the platen will rotate intermittently. As the specified amount of turning done by the platen has been indirectly detected by the detector unit 19, cpu 27 will stop the energization of the motor through the motor driver 29. At this time of stopping, the stopping position of the motor 10 and so that of the worm 18 vary, but if the pitch of the teeth is set so that this variation falls within the range where the teeth 13 and the worm wheel 22 are out of engagement, the variation will not affect the amount of rotation of the platen.

When the teeth 13 and the worm wheel 22 are not engaged, the positioning of the platen 1 is made by the engagement between the ratchet 3 and the roller 6, so that the platen 1 will be fed exactly by the desired angle of rotation.

As hereabove-described, the platen driving device of this invention is composed by providing notches in part of the gear to be continuously driven by a motor, so that the platen is intermittently turned by this gear; for this reason, platen feeding can be made at a high accuracy, using a moderate price motor; thus the cost of the device as a whole is reduced.

What is claimed is:

1. A device for driving a platen comprising:

a motor for driving a gear train for rotating said platen;

said gear train comprising a worm and worm gear operatively connected between said motor and said platen and rotated by said motor for transmitting drive from said motor through said worm and worm gear to rotate said platen intermittently, said worm having an engaging portion along part of the periphery thereof comprised of at least one worm tooth for engaging and driving said worm gear when said at least one worm tooth is rotated into engagement with said worm gear by said motor and having a non-engaging portion along the remainder of the periphery for disengaging said worm from said worm gear when said at least one worm tooth is rotated out of engagement with said worm gear;

a ratchet operatively connected to said platen for rotating synchronously with said platen and having ratchet teeth;

a detent pawl adjacent said ratchet having resilient means for biasing said detent pawl into engagement with two adjacent ones of said ratchet teeth for accurately and firmly positioning said ratchet and said platen operatively connected thereto when said non-engaging portion of said worm disengages said worm from said worm gear, said ratchet being rotatable in either of two directions when engaged by said detent pawl and when said non-engaging portion of said worm disengages said worm from said worm gear such that said platen operatively connected thereto is also rotatable in either of two directions when said non-engaging portion of said worm disengages said worm from said worm gear; and control means connected to said motor for stopping said motor during a time period when said at least one worm tooth is rotated out of engagement with said worm gear.

2. A device for driving a platen as claimed in claim 1 wherein, said gear train further comprises an intermediate gear means operatively connected between said worm gear and said platen for transmitting drive from said motor, worm and worm gear through said intermediate gear means to rotate said platen.

* * * * *